United States Patent
Sussman

[11] Patent Number: 6,123,839
[45] Date of Patent: Sep. 26, 2000

[54] AUTOMATIC FLUID DISPENSING SYSTEM

[76] Inventor: Arthur Sussman, Box 113, Alpine, N.J. 07620

[21] Appl. No.: 09/055,412

[22] Filed: Apr. 6, 1998

[51] Int. Cl.[7] .............................. B01D 17/12; B67D 5/56; B67D 5/34
[52] U.S. Cl. ........................... 210/136; 210/90; 210/137; 210/169; 210/206; 222/23; 222/189.06; 222/251; 222/252; 417/151
[58] Field of Search ................ 210/90, 96.1, 97, 210/120, 130, 136, 137, 169, 198.1, 205, 206, 258, 259, 416.2, 433.1, 434, 753, 754, 764, 175; 422/256; 222/23, 52, 189.06, 251, 252, 318; 417/151, 174

[56] References Cited

U.S. PATENT DOCUMENTS

| | | | |
|---|---|---|---|
| 3,474,817 | 10/1969 | Bates et al. | 210/169 |
| 3,595,395 | 7/1971 | Lorenzen | 210/169 |
| 3,672,508 | 6/1972 | Simon | 210/169 |
| 4,381,240 | 4/1983 | Russell | 210/169 |
| 4,584,106 | 4/1986 | Held | 210/169 |

Primary Examiner—Joseph W. Drodge
Attorney, Agent, or Firm—Richard A. Joel, Esq.

[57] ABSTRACT

An essentially non-electric automatic fluid dispensing system is provided wherein a first induced pressure induces flow of a first fluid, which in the preferred embodiment is a liquid sanitizer. The system further divides the first fluid into a first divided fluid and second divided fluid, said first divided fluid inducing flow into a second fluid located in an airtight container for the second fluid, a regulator valve for varying the second divided fluid, a dispensing valve for displacing the second fluid from the said container under pressure and for varying the flow rate of the said displaced second fluid, and connector for impressing the displaced fluid into a receiving line which in the preferred embodiment is a water circulation circuit.

26 Claims, 6 Drawing Sheets

AUTOMATIC FLUID DISPENSING SYSTEM

BACKGROUND OF THE INVENTION

This invention relates to fluid dispensing systems, more particularly to systems that require that a fluid or fluids be displaced from one or more storage locations to one or more central processing locations, and wherein fluids are combined to form a pre-determined mixture.

CROSS REFERENCE TO RELATED APPLICATIONS

Automatic liquid dispensing systems are well known and are used widely in processes where one or a multiple of products are combined to produce a finished product, including manufacturing of foods, chemicals, and treatment processes. With such processes, products which may be liquids are often stored at a remote bulk storage location, and transferred to process storage containers using dispensing equipment, including automatic liquid dispensing equipment when the transfer of liquids is required. The automatic dispensing equipment transfers the individual products from process storage containers, to a central mixing processor at a predetermined flow or feed rate. Dispensing of such ingredients can be a gravity feed process, using elevated storage containers, and automatically activated valves that allow the transfer of products from storage containers to a central location where products are combined to form a finished product.

Other automatic dispensing systems are pumps more disposed to be activated electrically, to transfer product from remote storage locations to the central station. The pump, or pumps displace the ingredients from storage containers, and transfer such ingredients via tubing in the case of liquids, to the central location for finishing or to first stage processing where more than one mixing process is required. As such, a multiple of dispensing processes may be used. Similar automatic liquid dispensing equipment is used during final packaging where automatic liquid filling into containers is required. Automation control components connected to the dispensing pump or pumps vary the flow rate of based on but not limited to the physical and chemical properties of the liquid products including viscosity, weight, pH, oxidation reduction potential (ORP), to produce a predetermined mixture within the central container.

Known automatic dispensing systems including automatic liquid dispensing systems are used widely in water treatment processes, including the treatment of drinking water, and the treatment of swimming pools and spas. As a prelude to description of the preferred embodiment of this patent, the following provides some technical background and description of automatic liquid dispensing systems that are available, primarily for commercial facilities, to sanitize swimming pool and spa water.

Virtually all swimming pools and spas contain filtration systems that are used to protect the health, safety, and comfort of swimmers. Water treatment of pool water is a 2 stage process that includes the water filtration process, and the water sanitation process. The filtration process cleanses the water of debris and particulate that may collect in the water such as tree leaves, branches, soil, and bathing oils. The sanitizing involves a water treatment process that frees the water of bacteria, and plant life such as algae that may otherwise be harmful to swimmers. Sanitizing of the water makes use of methods of dispensing sanitizing ions into the water by means of the pool water circulation system. The filtration system designed into most pools consists of a water circulation pump driven by a motor ranging in size from approximately ½ horsepower for smaller pools to 30 horsepower for the very largest commercial pools, a filter pod containing either sand or diatomaceous earth, and in some instances a water heater. A control system containing a power switch that activates the filtration system, and a clock timer control is used to electrically activate the filtration system, and to automatically deactivate the system during a selected time period or periods. The filtration components are usually installed at a remote location from the pool, or in a separate remote enclosure or are connected to the pool skimming components and drain by a pipe system that forms a closed water loop, and thereby a continuous water path between the pool and filtration components. When activated, the water circulation pump forces the pool water through the filter pod, then through the heater if used, and to the pool through return ports distributed around the perimeter of the pool. The water is thereafter transferred back to the water circulation pump via skimmer ports or gutters installed near the pool water surface, and drain ports installed at the base of the pool. Larger debris is captured by strainers installed into the skimmer and drain ports. Smaller debris is pumped into the filter pods connected to the water pump, where the water is filtered, and returned to the pool via the pool return ports.

As stated previously, the filtration process cleanses the water of particulates and debris, but does not cleanse the water of bacteria and microscopic plant life. The latter is accomplished using a sanitizing process which involves dispensing chemicals or another treatment process to chemically interact with otherwise harmful bacteria and microscopic plant life. Such treatment is done with the use of either solid time release sanitizing compounds placed directly into the pool water, or with liquid sanitizers such as chlorine that are dispensed into the pool using pumping type dispensing systems. Water sanitizing is done with the use of oxidizing agents such as bromine or chlorine.

When such an oxidizer is added to pool water such as sodium hypochlorite, sanitizing ions in the form of "free" chlorine ions are produced which react with, and destroy certain harmful bacteria such as coliform and microscopic plant life such as algae. As part of the sanitizing process, the pH of the water is treated to control the acidity or alkalinity of the pool water. For this, a very light acid is dispensed into the water such as muriatic acid for the comfort and safety of swimmers, and to maximize the solubility of the sanitizer in the water, and thereby minimizing the use and cost of the chlorine sanitizer.

Current methods of dispensing sanitizer and pH additives to a pool depend upon the type, size and usage of the pool.

Commercial pools such as hotel pools, theme park pools and municipal pools are in the 50,000 gallon to 1 million gallon range, and usually require automatic dispensing systems, and liquid sanitizers to treat the water. Residential pools are usually in the 5,000 gallon to 35,000 gallon capacity range, and solid time release sanitizers are periodically added manually to the water are used.

With automatic dispensing systems for the larger commercial type pools, dispensing equipment is installed near the filtration equipment usually in a separate room remote from the swimming pool. The dispensing system consists of a separate pump for the liquid sanitizer, and a separate pump for the light acid used to treat water pH. Separate storage containers of 30 to 55 gallons or more containing liquid sanitizer such as sodium hypochlorite, and muriatic acid are located within 10–25 ft of the filtration system, and water circulation pump. A water test chamber containing tubing connection fittings at each end of the chamber, with water test sensors attached within the chamber is installed near the dispenser pumps. Tubing that connects the test chamber with the water circulation line allows a continuous sample of pool water to circulate through the test chamber. The water test sensors are immersed in the pool water sample that flows through the test chamber. An electronic control system forms an electrical connection with the dispensing pumps and water test sensors installed in the water test chamber. One electrical circuit within the control system forms an amplifier circuit for signals received from the water test sensors in proportion to the water sanitizer level and the water pH level. Another circuit forms programmable voltage reference setpoints for sanitizer and pH levels to be maintained, and a means of comparing sensor signals with the programmed voltage setpoints. Another circuit provides a means of activating and de-activating the dispenser pumps in response to the output of the comparing circuit, and a means of displaying sensor voltage values and programmed setpoint voltage values.

When the pool filtration system and the automatic dispensing system are activated, pool water circulates in a continuous closed path through interconnecting water pipes that are installed between the pool, water circulation pump, filtration pod, and water heater if used. A portion of the circulating water is displaced from the circulating water line to the water test chamber by means of connecting tubing and fittings installed at the water pump intake side and the filter pod output side. This forms a differential pressure at the test chamber that keeps pool water flowing through the chamber continuously while the water circulation pump is activated. As water circulates through the test chamber, the immersed sensors emit voltage outputs at millivolt levels that are in proportion to water sanitizer and pH concentrations of the pool water.

The voltage signals are thereafter transmitted to the control system via interconnecting electrical cables. Setpoint voltage levels are programmed, and stored in the control setpoint circuit, and which are representative of the desired sanitizer and pH concentration level to be automatically, and continuously maintained. The sensor signals are amplified, and transmitted to the comparing circuit which compares the sensor signals with the programmed voltage setpoints. When the sanitizer sensor (ORP) and pH signals are below the programmed setpoints, the comparing circuit activates a driver circuit for the appropriate dispenser pump which then activates the appropriate pump which then pumps either sanitizer or muriatic acid from the appropriate storage container into the water circulation line via tubing installed between the storage container, pump head, and water circulation line.

As the sanitizer, and muriatic acid, if used, are added to the pool water, the corresponding sensor measures the increased chemical levels and produces an increased signal in proportion to the chemicals added, usually in parts per million. When the correct sanitizer level, and pH levels are injected, and signaled by the corresponding sensor, the comparing circuit senses that a satisfied condition has been reached, and then de-activates the corresponding dispenser pump driver circuit which then turns the dispenser pump OFF. When either the pool water sanitizer, or pH level again goes below the setpoint value, the appropriate pump again turns ON, is again controlled through the electronic control system, and returns to the OFF condition when a sufficient amount of corresponding sanitizer, or muriatic acid has been dispensed into the pool water.

BRIEF SUMMARY OF THE INVENTION

An object of this invention is to provide a novel fluid dispensing system. It is another object of this invention to provide a dispensing system where the fluid in the preferred embodiment is a liquid. It is another object of this invention to provide a fluid dispensing system that is automatic. It is another object of this invention to provide a fluid dispensing system that is essentially non-electric. It is further objective of this invention to provide a fluid dispensing system that can be readily varied. Per the description of the preferred embodiment of this invention, it will be shown that the invention provides means for the residential pool owner and small commercial pool operator to automatically sanitize pool water with equipment that is substantially of lower cost and labor than methods used heretofore, and offers substantial benefits in reliability, safety, and environmental compliance. Other and additional objects of this invention will become apparent from the considerations of this entire specification including the claims and drawings hereof.

In accord, and fulfilling these objects, one aspect of this invention is the use of a first fluid with pressure thereupon induced, and automatic non-electric means of displacing a second fluid from within an airtight container, and imposing such displaced fluid for processing purpose. The system of this invention constitutes a marked improvement over manual dispensing systems, and with the intended purpose fulfilled, with greater reliability, and substantial reduction in the labor that is otherwise required, and substantial improvement in regulation thereby reducing material use, cost, and environmental hazards.

BRIEF DESCRIPTION OF THE SEVERAL VIEWS OF THE DRAWINGS

Understanding of this invention will be facilitated by reference to drawings of FIG. 1, FIG. 2, FIG. 3, FIG. 3a, FIG. 4, and FIG. 5. It is expressly understood however, that the drawings are for illustrative purposes only, and are not to be construed as defining the limits of the invention. In the figures, wherein corresponding numerals indicate corresponding parts.

The parts used in the system of this invention include:
1. First tubing, preferably a plastic material for containing fluid, and fluid pressure thereupon imposed;
2. A first dividing connector for dividing fluid in the first tubing;
3. Container means for containing fluid, which in the preferred embodiment of the invention is a liquid and includes a container cap adapted for attaching dispensing valve, and gasket to form an airtight seal between container cap and container;
4. A dispensing Valve containing connector means for interconnection with a first dividing connector, for connection with a fluid transfer assembly immersed in liquid sanitizer disposed within said container, and a connection with second tubing, including attachment means and a gasket for airtight attachment to said container cap;
5. A safety valve providing pressure release when an excess pressure condition exists;
6. A regulating valve to vary the flow rate of liquid sanitizer through the dispenser valve.
7. A check valve coupled to said second tubing to prevent reverse flow of sanitizer through the Dispensing Valve thereby protecting fluid disposed within container from contamination possible from reverse flow, and preventing blockages within dispensing valve.
8. A fluid transfer assembly immersed in said liquid sanitizer within the container, and which induces sanitizer flow through said dispensing valve in response to pressure induced within said container.
10. A diverter valve which diverts a water portion away from the first dividing connector to the dispensed valve output and forming selective dispenser valve anti-clogging means.

DETAILED DESCRIPTION OF INVENTION

Figure 1:
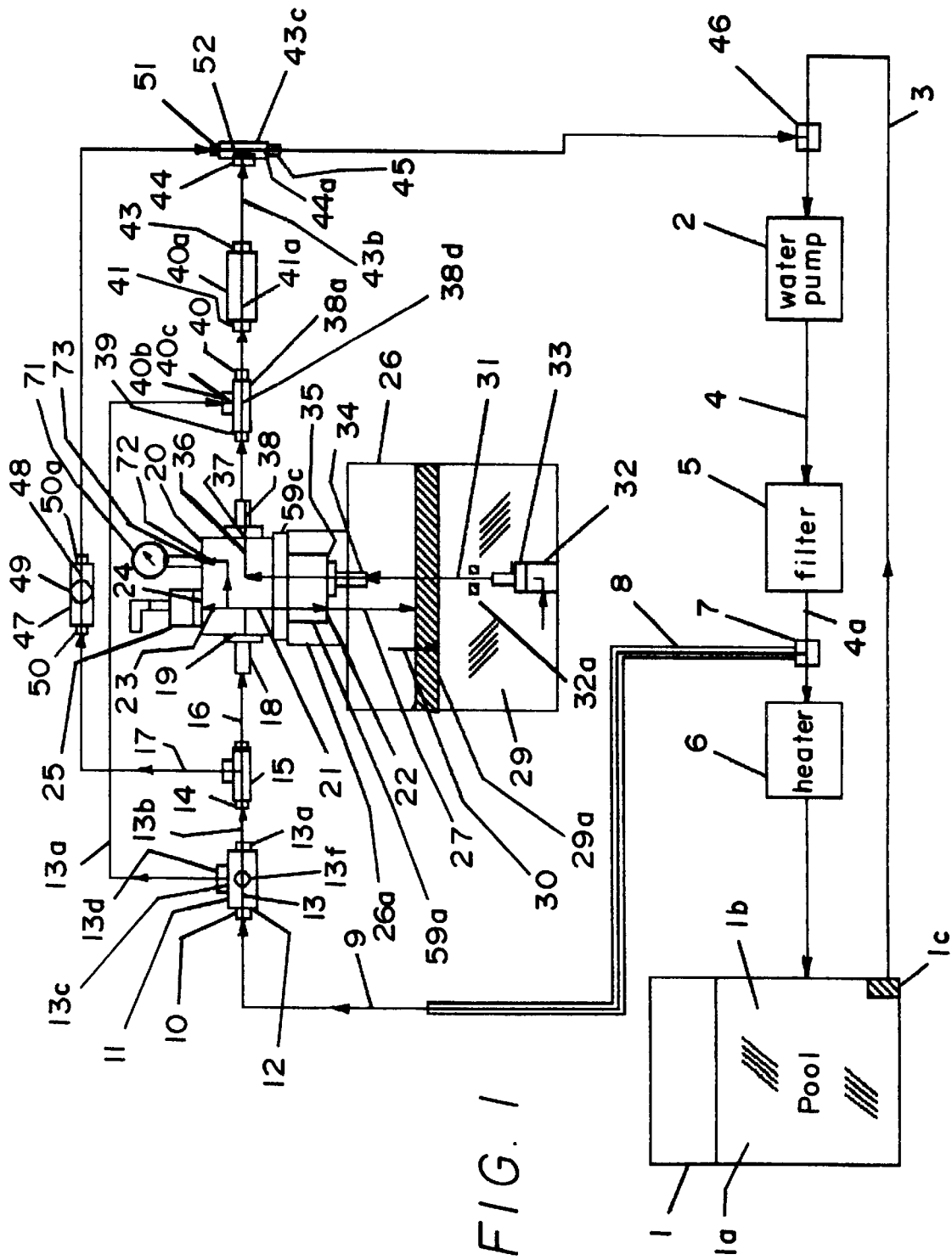
FIG. 1 is a schematic view of the preferred embodiment of this invention, and shows fluid flow paths.

With reference to FIG. 1, there is shown a pool 1, which in this embodiment contains pool water 1a. Water circulation pump 2 when activated circulates said pool water in a continuous circuit through interconnecting piping 4 coupled to said pool 1, water circulation pump 2, water filter 5, water heater 6, if used. The water pump imparts a pressure upon water circulation circuit 3, and induces flow within said water circulation circuit and thereby pool water flows through filter 5 to cleanse pool water of particulate and debris, through heater 6 if used which heats said pool water if required, through pool 1, through water drain 1c disposed within pool, and thereafter to water pump 2 for re-circulation of said pool water. Said water circulation flow is continuous while the water pump is activated, thereby forming continuous pool water filtration means.

Tubing 8 is attached to connector 7 disposed preferably at filter output pipe 4a. By means of pressure induced in the water circulation circuit 3 by water circulation pump, a water portion of the water circulation circuit is conducted through a hole in the center of the connector 7, and pressure impressed upon a water portion induces flow of the water portion 9 through tubing 8. It is herein noted that further in this specification, where not otherwise indicated, flow of fluid and herein liquid, is to be construed as to be through tubing preferably flexible, and non-corrosive and disposed upon connectors at each end, wherein connectors, and connector attachments in all instances form an airtight seal.

Water portion 9 flows to connector 10 attached to port 1, 12 of diverter valve 11, then through hole in center of connector 10 and thereafter through first passageway 13 within diverter valve and thereafter through connector 13a and thereafter through tubing to port 1, 14 of first dividing connector 15 where said water portion is divided into a first divided water portion 16 and second divided water portion 17. The diverter valve has a variable occlusion and is preferably manually activated forms selectable undiverted water portion 13b, and diverted water portion 13e. The occlusion is preferably in undiverted disposition, and water portion flowing through diverter valve port 1 connector, and through diverter valve first passageway 13 and through connector at port 2 and through tubing to first dividing connector 15 is undiverted water portion 13b.

Pressure impressed upon first divided water portion 16 induces flow through tubing to connector 18 attached to first port 19 of dispenser (or dispensing) valve 20. First divided water portion flows through a hole in the center of connector 18 then through dispenser valve first passageway 21 to valve second port 22 disposed within airtight container 26, and through second passageway 23 to dispenser valve second port 24 and there impresses pressure induced within first divided water portion upon safety valve 25 there attached, and through dispenser valve fourth passageway 73 and impressed upon pressure gauge 7 there attached at dispenser valve fifth port 72. First divided water portion that flows through dispenser valve first passageway flows to dispenser valve second port and into airtight container 26, and accumulates preferably upon the surface 29a of sanitizer 29, preferably liquid, therein contained, and impresses pressure 30 induced upon the first divided water portion upon liquid sanitizer. In this embodiment, dispenser valve mounting stem 59a, having threads 59b attaches to container cap 26a like an internal thread, with gasket 59b interposed between and forming an airtight attachment of dispenser valve to container cap 26a. Again, in this embodiment, container cap 26a having second internal thread 26b attaches to container 26 having an opening with a like thread, and with gasket 26c interposed between cap and container thereby forming an airtight seal.

Liquid sanitizer 29 preferably has a specific gravity that is greater than first divided water portion that flows into container, and therefore is disposed beneath the first water portion which accumulates to the top surface 29a of the liquid sanitizer. Pressure induced upon first divided water portion is thereafter impressed upon the liquid sanitizer 30. By hydrostatic means, pressure induced upon sanitizer induces flow of sanitizer through fluid transfer assembly 31 immersed within sanitizer 30. Sanitizer flows through strainer 32, preferably containing mesh type filter material and disposed preferably to the bottom of the container 26 by weight means 32a and forming dispenser valve anti-clogging means. Sanitizer 29 thereafter flows through connector hole and tubing to connector 34 attached to dispenser valve third port 35. Sanitizer flows through hole within said connector 34, and through third passageway 36 within the dispenser valve 20 and thereafter to dispenser valve fourth port 37 which forms dispenser valve output means. Sanitizer thereafter flows through hole in connector 38 attached to fourth port, to second dividing connector 38a port 1, 39, then preferably through second dividing connector first passageway 38d, then through connector 40 therein attached, and through tubing to check valve 40a first connector attached to check valve port 1, 41. Sanitizer thereafter flows through check valve passageway 41a, and through connector 43 attached to check valve port 2, and through tubing to third dividing connector 43c port 1, 44, then through third dividing connector first passageway 44a, then through connector at port 2, 45 and through connector 46 attached to water circulation circuit, and thereafter impressed upon water circulation circuit through the hole in said connector 46. Liquid sanitizer 29 is thereby impressed upon water circulation circuit 3 which flows to pool 1, forming sanitized pool water 1b.

Figure 2:
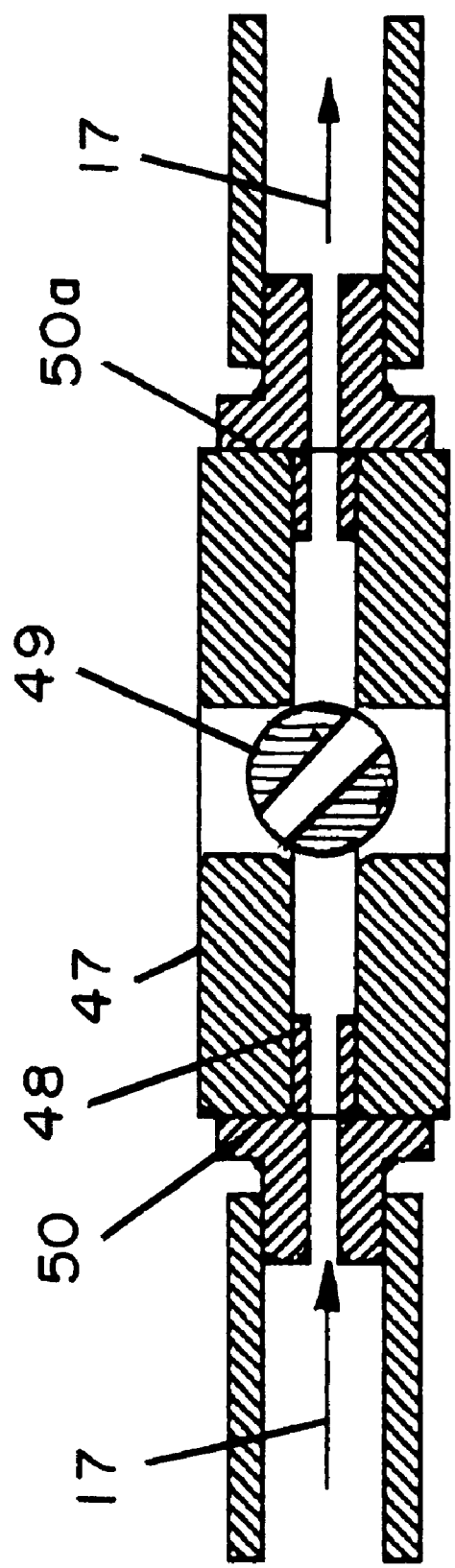
FIG. 2 is a cross sectional view of a Regulator Valve of this invention.

Referring to FIG. 2, regulator valve 47 has through passageway 48, and occlusion 49 forming varying means interposed passageway 48 to vary the size of opening within the passageway, and connector means for tubing attachment. Second divided water portion 17 flows through tubing to connector attached to the regulator valve port 1, 50 and which regulator valve passageway 48 and occlusion means 49 for varying said passageway, and thereby varying the flow of second divided water portion through the regulator valve, disposed to be closed to stop the flow of second divided water portion, or to be open to allow passage of said water portion, or to be in some intermediate disposition so as to vary the amount of second divided water portion flowing through the valve passageway. Disposition of occlusion means 49 is preferably actuated manually, however actuation can be by electrical or by mechanical means.

Referring again to FIG. 1, when regulator valve 47 is disposed to be at some open disposition, second divided water portion 17 flows through connector 50, then through passageway 48, and through connector at port 2 50*a* and thereafter flows through tubing and to second dividing connector port 3, 51, and through second passageway 52, and to second dividing connector port 2, 45 and thereafter through tubing and through connector 46 attached to water circulation circuit 3, thereby impressing the second divided water portion upon said water circulation circuit, and thereby into said pool 1 containing pool water 1*a*.

Juxtaposition of second divided water portion 17 flowing through third fluid dividing connector second passageway 52, and sanitizer portion 43*b* flowing through third fluid dividing connector first passageway 44*a* and thereafter is impressed upon water circulation circuit and forms a means of varying sanitizer portion 43*b* flow to water circulation circuit. The proportion of sanitizer portion 43*b* that flows through passageway and to water circulation circuit compared to the proportion of second divided water portion 17 that flows to water circulation circuit is in the same proportion as pressure induced within sanitizer portion 43*b* compared to pressure induced within second divided water portion 17 at said juxtaposition.

When regulator valve varying means 49 is disposed to a closed position wherein pressure induced into second divided water portion 17 flowing to third dividing connector port 3, 51 is approximately zero, sanitizer portion flow through third dividing connector 43*c* is a maximum. When regulator valve varying means 49 is disposed to be full open, pressure induced upon second divided water portion 17 flowing to third dividing connector port 3, 51 is a maximum, and sanitizer portion 43*b* that flows through third dividing connector is a minimum. When regulator valve varying means is disposed to be intermediate, pressure induced upon second divided water portion flowing to port 3 is intermediate, and therefore sanitizer flow through third dividing connector is intermediate. Variation in said disposition of regulator valve varying means 49, and juxtaposition of sanitizer flow to third fluid dividing connector, and flow of second divided water portion forms a means of varying sanitizer portion flow preferably to said water circulation circuit 3.

Figure 3:
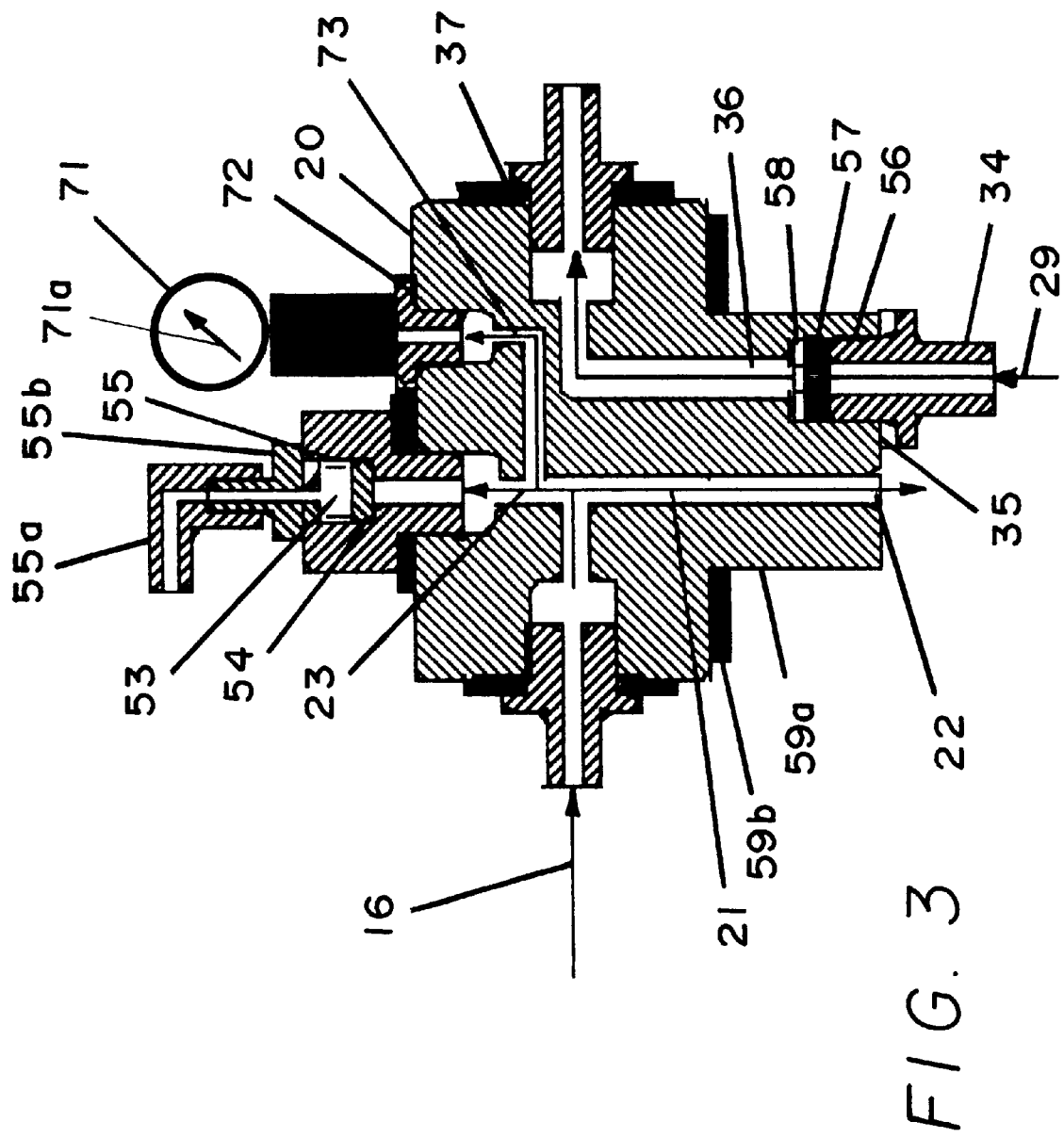
FIG. 3 is a cross sectional view of a Dispenser (or Dispensing) Valve, with attached Safety Valve, Pressure Gauge, and connector means for tubing.

Referring to FIG. 3, safety valve 25 attaches to dispenser valve 20 in alignment with second passageway 23. Preferably disc 54 forming occlusion means disposed within passageway 53, and in this embodiment of the invention includes mechanical spring 55 which disposes disc such that safety valve passageway is normally closed. When the pressure induced by first divided water portion 16, and flows through dispenser valve second passageway 23 and impressed upon safety valve exceeds a predetermined pressure, the spring 55 activates. Such activation displaces the disc 54 and causes the passageway to be open, thereby allowing flow of unwanted pressure induced within the container 26, to flow through safety valve output port 55*b*, and thereby forming a safety pressure relief means. Direction tubing 55*a* in this embodiment attaches to safety valve output port 55*b*, and forms means of varying direction of flow of fluid, preferably a liquid, that flows out of safety valve output port 55*b*.

Figure 3A:
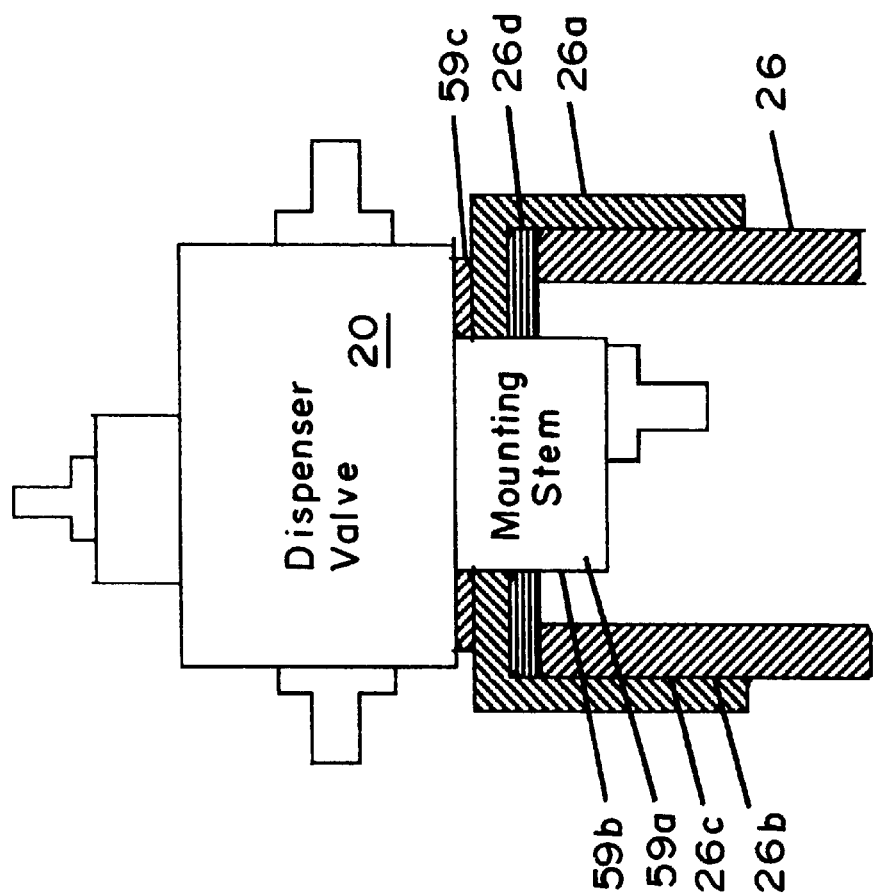
FIG. 3a is diagram of a Dispenser Valve/Container Cap assembly.

Referring to FIG. 3*a*, in this embodiment, threaded stem 59*a* having male thread 59*b* attaches to threaded hole in container cap 26*a*, having a like female thread, and gasket 59*c* is interposed between dispenser valve and container cap and forms an airtight attachment of dispenser valve 20 to container cap 26*a*. Container cap 26*a* and second internal thread 26*b* forms a means for attachment to neck 26*c* of the container 26 opening having a like thread 26*c*. Gasket 26*d* is interposed between container neck 26*c* and cap 26*a* and forms a airtight seal between container 26 and cap 26*a*.

Orifice 56 disposed within third passageway 36 of dispenser valve 20, but not limited thereto forms means of producing sanitizer flow rates that are very low. In this embodiment, the size of the opening in the passageway essentially determines the maximum sanitizer flow rate capability of the dispensing valve for any pressure induced within the container. Said orifice 56, that may be removable, forms a means of modifying any dispenser valve per this invention to produce variable, including very low sanitizer flow rates, and thereby avoiding the need for specific valves for each sanitizer flow rate.

In this embodiment, Orifice 56 contains through hole 57 with a diameter dimension preferably in, but not limited to, the 0.001 inch to 0.025 inch range. Orifice 56 is installed preferably into the dispenser valve 20 third passageway 36 which is counterbored to permit installation of an orifice, and to provide a mounting surface 58 for gasket 59 to form airtight seal of orifice 56 within the passageway 36. Gasket 59 is disposed onto the counterbored surface, and the orifice is placed in contact with gasket 59. Connector 34 attaches to dispenser valve third port 35 by a mounting thread, and such attachment forms a compression of orifice and gasket against the counterbored surface and thereby forms an airtight seal at the counterbored surface within the passageway, thereby forcing sanitizer 29 to flow through hole 57 hole contained in the orifice 56, and thereafter to output port.

Figure 4:
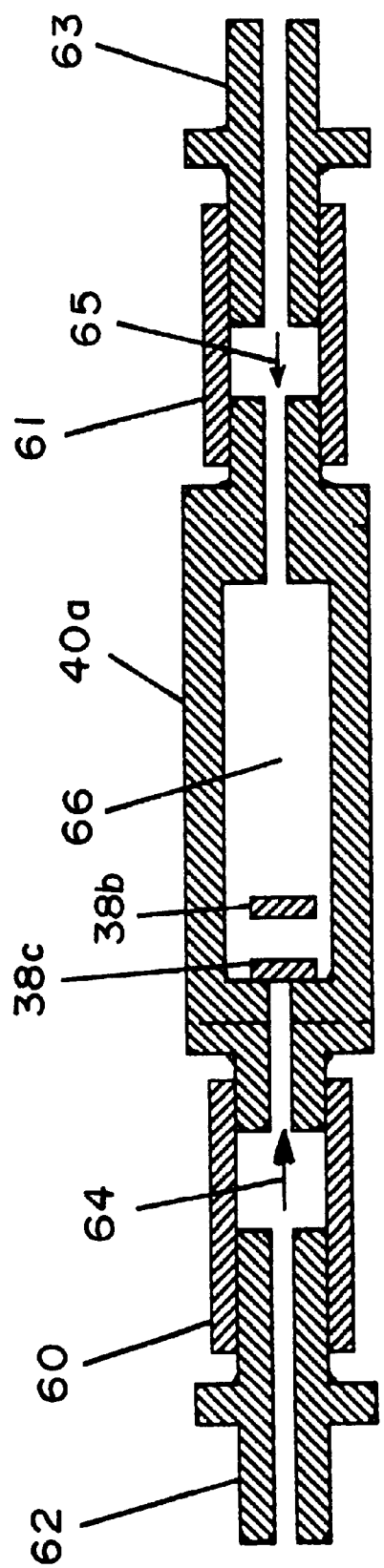
FIG. 4 is cross sectional view of a Check Valve with connector means for tubing.

Referring to FIG. 4 in this embodiment of the invention, check valve 40*a* is interposed between tubing 60 that attaches to second dividing connector port 3, 62 and tubing 61 that attaches to third dividing connector port 1, 63 and enables fluid flow only in the direction of sanitizer flow, 64. Movable occlusion means 38*b*, preferably a disc located in passageway 66 disposes said passageway to be open when said sanitizer flows, and to be closed when said second divided water portion, or water from water circulation circuit flows in the opposite direction, 65. Significance of the check valve can be more easily explained by referring again to FIG. 1. Prevention of fluid flow in the reverse direction through check valve thereby prevents sanitizer from flowing away from said dispenser valve third passageway 36, and back into said container 26 through fluid transfer assembly 31, forming assurance that the third passageway at all times contains sanitizer in liquid form. Absence of liquid sanitizer in third passageway 36 enables undissolved sanitizer solids consisting of, but not limited to, salts to accumulate within the third passageway that may result in clogging of passageway 36 and consequential unwanted blockage of sanitizer flow through passageway 36. Accordingly, when pressure induced into container 26 from the first divided water portion is removed due for example to a stoppage of water circulation pump that induces water pressure in said water circulation circuit, flow of sanitizer 29 in the reverse direction is prevented, and sanitizer that was disposed within the passageway 36 before the stoppage remains within the third passageway and at all times contains sanitizer in its liquid form. This forms an anti-clogging means within the dispenser valve.

Referring again to FIG. 1, in this embodiment of the invention diverter valve port 3, 13c attached connector 13d is connected by tubing to second dividing connector port 3, 40b and is interposed between the tubing connecting dispenser valve output 37 and the check valve 40a. Variable occlusion means 13f within the diverter valve, and actuator preferred to be manual, but which actuation can use electrical or mechanical means, forms a means of diverting flow of water portion 9 away from first dividing connector, and impressing of water portion 9 onto second dividing connector 38a, thereby impressing pressure induced in the water portion upon dispenser valve output 37. Diverted water portion 13e flows through tubing to second dividing connector 38a which is upstream of check valve 40a, enabling reverse flow of water portion 9 through passageway 36, and pressure therein is induced to cleanse dispenser valve third passageway 36, and orifice 56 therein and dispose of any blockage or partial blockage that might occur, thereby forming a dispenser valve selectable anti-clogging means.

In this embodiment of the invention, for practical purposes, container having a liquid sanitizer capacity of 5 to 10 gallons is used. When the container is depleted of sanitizer, it is either refilled or replaced by another filled container. Although larger containers can be used, sanitizer refilling is required approximately every 2 to 4 weeks, depending upon a multiple of factors including but not limited to the pool size, usage, and climate.

Figure 5:
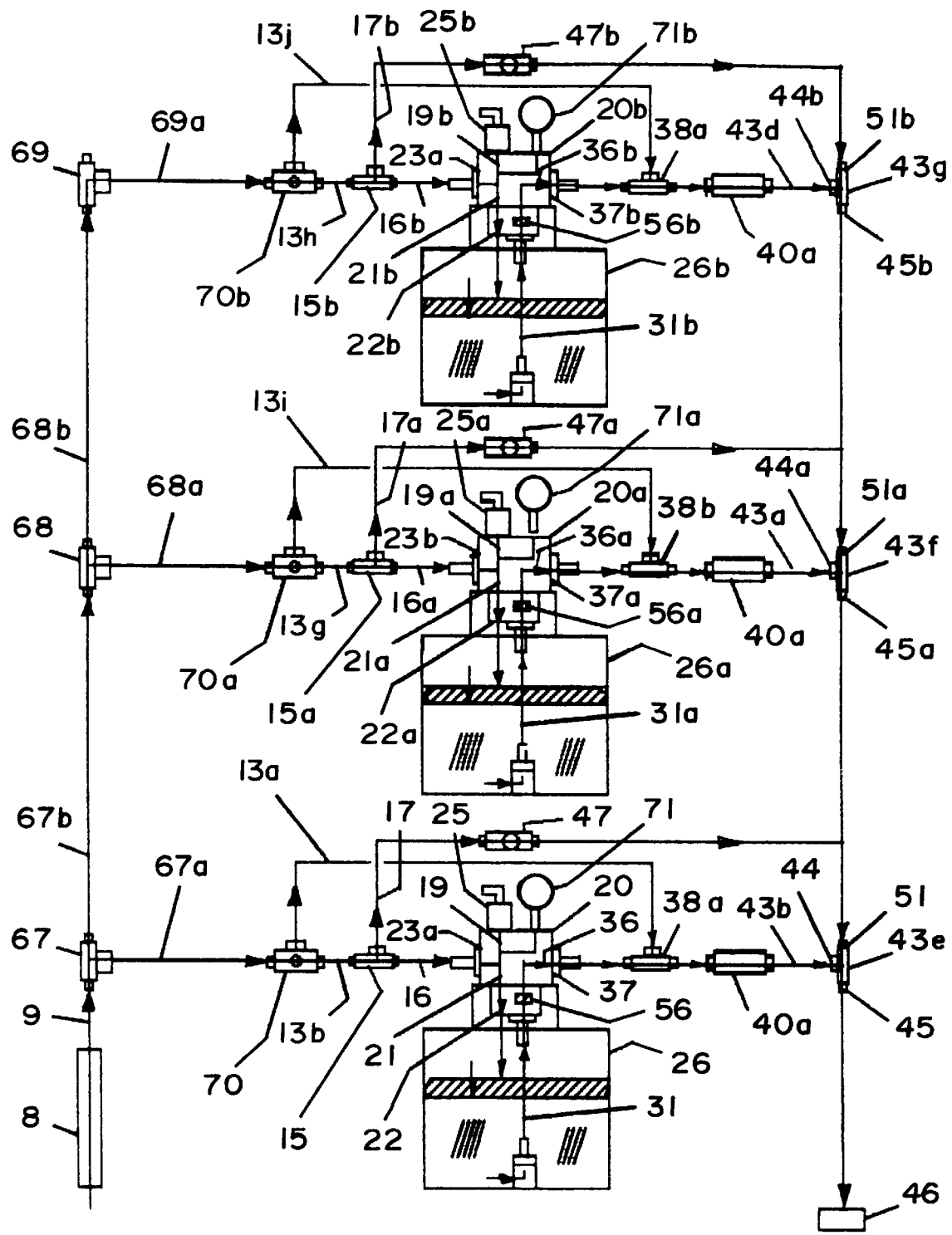
FIG. 5 is a schematic diagram of another embodiment of this invention, and shows use of multiple dispensing means.

FIG. 5 shows another embodiment of the invention, which makes use of a plurality of containers to dispense liquid sanitizer into a water circulation circuit, thereby forming means for increasing sanitizer storage capacity and reducing time and labor required to maintain the sanitizer dispensing system. This embodiment makes use of a plurality of 3 containers, however this is not to be construed as a limitation of this invention.

Water portion 9 flows through tubing 8 and preferably a single tubing containing dividing connectors 67, 68, and 69. Said water portion flows through the first passageway having multiple dividing connectors and forms first water portions 67a, 68a, and 69a, and second water portions 67b, 68b, and 69b, with cap means over 69b being removable for additional dividing connectors. The first water portion flow through tubing to diverter valve 70, 70a and 70b forming undiverted water portions 13b, 13g, and 13h, and diverted water portions 13b, 13g, and 13j. Undiverted water portions flow through tubing to first dividing connectors 15, 15a, and 15b, and there forms first divided water portions 16, 16a, and 16b, and second divided water portions 17, 17a, and 17b. First divided water portions at each said first dividing connector flow through first ports 19, 19a, and 19b of corresponding dispensing valves 20, 20a, and 20b, and through corresponding first passageways 21, 21a, and 21b and corresponding second passageways 23, 23a, and 23b, and is impressed upon corresponding safety valves 25, 25a, and 25b and through corresponding fourth passageways and is impressed upon pressure gauges 71, 71a, 71b, and thereafter through corresponding dispenser valve second ports 22, 22a, and 22b. Said pressure induced upon each first divided water portion and flowing into each said container impresses said pressure upon sanitizer within corresponding containers 26, 26a, and 26b, which are each airtight. Said pressure forces sanitizer flow respectively and in sequence through corresponding fluid transfer assemblies 31, 31a and 31b, and dispenser valve third passageways 36, 36a, and 36b, orifices 56, 56a and 56b preferably therein disposed, dispenser valve output ports 37, 37a, and 37b, through each of corresponding second dividing connector 38a, 38b, and 38c, through corresponding check valves 40a, 40b and 40c, through corresponding third dividing connector first passageways 44, 44a, and 44b and preferably through port 3 and through second passageway of downstream third dividing connector, each being installed, preferably in series, within tubing 52. Sanitizer thereafter flows through connector 46 and thereafter is impressed upon said water circulation circuit, which moves said impressed sanitizer within said pool water. Second divided water portions 17, 17a, and 17b flow through tubing and through corresponding regulator valve 47, 47a, and 47b, and through tubing to port 3 51, 51a, and 51b of each corresponding third dividing connector 43e, 43f, and 43g, wherein regulator valves vary pressure induced upon each second divided water portion upon each port 3 of the third dividing connector, each sanitizer portion flow 43b, 43c, and 43d having induced pressure juxtaposed thereupon. Such juxtaposition at each respective third dividing connector causes each said varied pressure to be induced upon each first divided water portion by a corresponding regulator valve to vary flow of sanitizer portion therein juxtaposed, thereafter flowing through tubing 52 and through connector 46 and thereafter being impressed upon the water circulation circuit.

In the preferred embodiment of the invention, referring again to FIG. 3, pressure gauge 71 is attached to dispenser valve port 5, 72 and is preferably aligned with forth passageway 73 of dispenser valve. Pressure induced upon first divided water portion 16 and thereafter impressed upon sanitizer 29 disposed within container 26, (see FIG. 1) induces sanitizer flow, which is thereupon impressed, wherein pressure gauge 71 preferably indicates pressure induced within container 26, and the sanitizer flow thereby produced. Pressure gauge readout 71a forms a means of more precisely controlling sanitizer flow rate, in place of variation of the regulator valve that may require trial and error settings before a required ideal sanitizer flow rate adjustment is attained.

While two embodiments of this invention have been shown and described in detail, it is expressly understood that the invention is not limited thereto. Various changes may also be made in the design and arrangement of the parts without departing from the spirit and scope of the invention as the same will now be understood by those skilled in the art.

What is claimed is:

1. An automatic fluid dispensing means comprising:
   fluid input means, and means for inducing pressure on said fluid and thereby inducing said fluid flow;
   fluid flow dividing means which divides fluid flow into a first fluid flow divided fluid portion, and a second fluid flow divided fluid portion;
   an airtight container having fluid therein;
   means for impressing the first fluid flow divided portion and said induced pressure upon the fluid disposed with the container;
   means for displacing fluid within said container in response to said induced pressure from the first fluid flow divided portion, and output means for said displaced fluid;
   means for transmitting said displaced fluid from said output to said fluid flow dividing means;
   transmitting means for transmitting the second fluid divided portion to the second fluid flow dividing means, and means located within said transmitting means which varies the second fluid divided portion at the second fluid dividing means and thereby varies the flow of said displaced fluid; and, means for transmitting said displaced fluid from the second fluid flow dividing means to receiving means.

2. An automatic fluid dispensing system in accordance with claim 1 wherein:
the fluid is liquid.

3. An automatic fluid dispensing system in accordance with claim 2 wherein:
the fluid disposed within the container is liquid sanitizer.

4. An automatic fluid dispensing system in accordance with claim 1 wherein:
the fluid input means comprises non-corrosive, and flexible, tubing material to permit outdoor use, and to permit attachment to connector means.

5. An automatic fluid dispensing system in accordance with claim 1 wherein:
the fluid disposed within the container is of greater specific gravity than the first divided flow portion, and whereby displacement of fluid disposed within said container is induced by pressure induced upon the first divided portion and impressed upon fluid disposed within the container.

6. An automatic fluid dispensing system in accordance with claim 1 wherein:
the means for displacing fluid disposed within the container comprises strainer means, tubing means connected to the strainer means and weight means coupled to the strainer means, all immersed within said disposed fluid, passageway connector means attached to said tubing means, and output connector means connected to the passageway connector means for displaced fluid, and
wherein the strainer means forms an anti-clogging means.

7. An automatic fluid dispensing system in accordance with claim 1 wherein:
means that varies said fluid flow at the second fluid dividing means comprises a valve with a variable passageway interposed in the transmitting means that transmits the second fluid flow divided portion to second fluid dividing means.

8. An automatic fluid dispensing system in accordance with claim 1 wherein:
the means of transmitting said displaced fluid from said output to the second fluid flow dividing means permits fluid flow in only one direction.

9. An automatic fluid dispensing system in accordance with claim 8 wherein:
the transmitting means comprises a check valve, and the fluid flow in one direction comprises displaced fluid.

10. An automatic fluid dispensing system in accordance with claim 9 wherein:
said induced pressure in the water circulation line is impressed upon the second fluid flow dividing means and the displaced fluid flow is the result of a combination of said induced pressure in a water circulation circuit, and pressure induced upon the displaced fluid, and pressure induced upon the second divided fluid portion and valve means for varying said pressure.

11. An automatic fluid dispensing system in accordance with claim 1 wherein:
the means for transmitting said displaced fluid from the second fluid flow dividing means to the displaced fluid receiving means comprises tubing, and wherein said fluid is the result of induced pressure impressed upon displaced fluid, and pressure induced upon second divided fluid portion and valve means for varying said pressure.

12. An automatic fluid dispensing system in accordance with claim 1 wherein:
the means for transmitting said displaced fluid from the second fluid flow dividing means to the displaced fluid receiving means is tubing, and wherein the receiving means comprises a circulation, having induced pressure.

13. An automatic fluid dispensing system in accordance with claim 1 wherein:
the fluid flow input means comprises tubing, and wherein the diverter valve means connected to said tubing forms selective means of impressing input fluid, to either first fluid flow dividing means, or the displaced fluid output connector thereby forming selectable means for reverse flow of pressure thereby induced, and thereby forming selectable separate passageway anti-clogging means.

14. An automatic fluid dispensing system in accordance with claim 1 further including:
valve means wherein induced pressure on the input fluid is impressed upon valve means that activates when predetermined pressure is exceeded, thereby releasing unwanted pressure, and thereby forming over-pressure safety means.

15. An automatic fluid dispensing system in accordance with claim 1 further including:
gauge means wherein induced pressure on the input fluid is impressed on the gauge means which forms input fluid pressure readout means.

16. An automatic fluid dispensing system in accordance with claim 1 wherein:
the displaced fluid output means comprises separate passageways, and includes orifice means that is removable and is therein disposed, and gasket means to form an airtight seal which forces the flow of displaced fluid through said orifice, and thereby forming a means of varying an extremely small displaced fluid flow rate.

17. An automatic fluid dispensing system in accordance with claim 1 further including:
fluid input means, and means for inducing pressure on said inputted fluid and thereby inducing fluid flow;
a plurality of first fluid flow dividing means which divides the inputted fluid flow into a plurality of first fluid flow divided portions and a plurality of second fluid flow divided portions;
a plurality of airtight containers;
means for impressing said first fluid divided portions and said induced pressure upon fluid disposed within a plurality of said containers;
a plurality of means for displacing fluid within said container, in response to said induced pressure from said first fluid flow divided portions, and a plurality of output means for said displaced fluid;
a plurality of means for transmitting said displaced fluid from said plurality of output means to a plurality of second fluid flow dividing means;
a plurality of transmitting means that transmit said second fluid divided portions to said plurality of means interposed on said transmitting means which vary said second fluid divided portion at said second fluid dividing means, and there vary the flow of said displaced fluid;
means for transmitting said displaced fluid from a plurality of third fluid flow dividing means to feed the receiving means.

18. An automatic fluid dispensing system in accordance with claim 17 wherein:

a plurality of means interposed in said plurality of means for transmitting said displaced fluid from said plurality of output means to a plurality of second fluid flow dividing means to permit fluid flow in one direction.

19. An automatic fluid dispensing system in accordance with claim 17 wherein:

a plurality of diverting means impress fluid at the fluid input means and said induced pressure upon a plurality of displaced fluid output means thereby forms a plurality of anti-clogging means.

20. An automatic fluid dispensing system to treat pool water with liquid sanitizer comprising:

a water circulation circuit including a pool having water therein, a pump having an output coupled to the pool and an input which circulates water therefrom and a filter connected to the pump to receive flow therefrom and having a filter output connected to the pool to provide filtered water thereto;

a diverter valve connected to the filter output to receive a portion of the water flow, said diverter valve having a first output and a second output;

a dividing connector connected to the first output of the diverter valve and having a first dividing output and a second dividing output;

a dispenser valve connected to the first dividing output and having an output;

a sealed container having the dispenser output connected thereto and having a liquid sanitizer therein said sanitizer being forced through the dispenser valve in a predetermined amount;

a check valve having an input connected to the output of the dispenser valve to prevent backflow and having an output; and, a connector coupled to the second output of the dividing connector and to the output of the check valve, said connector being coupled to the water circulation circuit to impart a predetermined amount of sanitizer therein.

21. An automatic fluid dispensing system to treat pool water with liquid sanitizer in accordance with claim 20 further including:

a heater coupled between the filter and the pool.

22. An automatic fluid dispensing system to treat pool water with liquid sanitizer in accordance with claim 20 further including a safety valve coupled to the container to prevent a pressure overload.

23. An automatic fluid dispensing system to treat pool water with liquid sanitizer in accordance with claim 20 further including a pressure gauge coupled to the container to indicate pressure therein.

24. An automatic fluid dispensing system to treat pool water with liquid sanitizer in accordance with claim 20 wherein:

the liquid sanitizer has a greater pH than water and is located beneath the water in the container and said container includes an outlet in the bottom of said container.

25. An automatic fluid dispensing system to treat pool water with liquid sanitizer in accordance with claim 20 wherein:

the diverter valve includes a passage extending therethrough and a central rotatable occlusion mounted in the passage to divert a selected portion of the flow.

26. An automatic fluid dispensing system to treat pool water with liquid sanitizer in accordance with claim 20 wherein:

the dispenser valve is mounted to the sealed container.

* * * * *